(12) United States Patent
Xu et al.

(10) Patent No.: US 7,681,079 B2
(45) Date of Patent: Mar. 16, 2010

(54) DIAGNOSTIC TEST SETS

(75) Inventors: Minyi Xu, Foster City, CA (US);
Michele Casalgrandi, Orlando, FL (US)

(73) Assignee: Oracle International Corporation, Redwood Shores, CA (US)

(*) Notice: Subject to any disclaimer, the term of this patent is extended or adjusted under 35 U.S.C. 154(b) by 437 days.

(21) Appl. No.: 11/710,703

(22) Filed: Feb. 26, 2007

(65) Prior Publication Data

US 2008/0209267 A1 Aug. 28, 2008

(51) Int. Cl.
G06F 11/00 (2006.01)
(52) U.S. Cl. ....................................................... 714/25
(58) Field of Classification Search ........................ None
See application file for complete search history.

(56) References Cited

U.S. PATENT DOCUMENTS

| | | | | |
|---|---|---|---|---|
| 5,664,173 A * | 9/1997 | Fast | ................................ | 707/4 |
| 5,819,066 A * | 10/1998 | Bromberg et al. | ............ | 707/102 |
| 6,466,940 B1 * | 10/2002 | Mills | ........................... | 707/102 |
| 6,681,344 B1 * | 1/2004 | Andrew | ........................ | 714/38 |
| 6,697,967 B1 * | 2/2004 | Robertson | ...................... | 714/43 |
| 6,993,518 B2 * | 1/2006 | Brinker et al. | ................... | 707/3 |
| 7,127,469 B2 * | 10/2006 | Lindblad et al. | ............. | 707/102 |
| 7,165,074 B2 * | 1/2007 | Avvari et al. | ................. | 707/102 |
| 7,167,870 B2 * | 1/2007 | Avvari et al. | ................. | 707/102 |
| 7,254,568 B2 * | 8/2007 | Modjeski et al. | ................ | 707/1 |
| 7,260,503 B2 * | 8/2007 | Stobie et al. | ................. | 702/183 |
| 7,313,564 B2 * | 12/2007 | Melamed et al. | ............. | 707/101 |
| 7,370,236 B2 * | 5/2008 | Szucs et al. | ..................... | 714/25 |
| 7,395,458 B2 * | 7/2008 | Shrivastava et al. | ............ | 714/47 |
| 7,403,954 B2 * | 7/2008 | Bornhoevd et al. | .......... | 707/102 |
| 7,415,635 B1 * | 8/2008 | Annangi | ........................ | 714/38 |
| 7,421,621 B1 * | 9/2008 | Zambrana | ..................... | 714/38 |
| 2004/0044699 A1 * | 3/2004 | He | .............................. | 707/201 |
| 2004/0153822 A1 * | 8/2004 | Arcand et al. | .................. | 714/38 |
| 2005/0228810 A1 * | 10/2005 | Modjeski et al. | ............. | 707/101 |
| 2007/0038890 A1 * | 2/2007 | El Far et al. | ................... | 714/25 |
| 2007/0078825 A1 * | 4/2007 | Bornhoevd et al. | ............ | 707/3 |
| 2007/0083793 A1 * | 4/2007 | Roth | ............................ | 714/25 |
| 2007/0271483 A1 * | 11/2007 | Kolawa et al. | ................. | 714/38 |
| 2008/0126293 A1 * | 5/2008 | Apuzzo et al. | .................. | 707/1 |
| 2008/0126390 A1 * | 5/2008 | Day et al. | ..................... | 707/102 |
| 2008/0162994 A1 * | 7/2008 | Szucs et al. | .................... | 714/25 |
| 2008/0270343 A1 * | 10/2008 | Brodsky et al. | ................. | 707/2 |
| 2008/0295076 A1 * | 11/2008 | McKain et al. | .............. | 717/124 |
| 2009/0055686 A1 * | 2/2009 | Tsang | .......................... | 714/33 |

OTHER PUBLICATIONS

Microsoft Computer Dictionary, Microsoft Press, 4$^{th}$ Ed., 1999, p. 242.*

(Continued)

*Primary Examiner*—Christopher S McCarthy
(74) *Attorney, Agent, or Firm*—Kraguljac + Kalnay, LLC

(57) ABSTRACT

Systems, methodologies, media, and other embodiments associated with metadata driven diagnostic test execution are described. One exemplary system embodiment includes a diagnostic test set repository where pre-defined and/or user-defined XML files that store the metadata for driving the diagnostic test execution can be stored. The example system may also include a first logic to prepare the XML file to control a diagnostic session and a second logic to control the diagnostic session based on the prepared XML file.

24 Claims, 6 Drawing Sheets

OTHER PUBLICATIONS

Oracle Corporation, Oracle Diagnostics 2.4; Diagnostic Tests Catalog for E-Business Suite, Oct. 2006, pp. 1-4, Oracle Corp., Redwood Shores, CA, US.

Oracle Corp, Sam's WebLog on Oracle Applications Technology; , Sep. 2006, pp. 1-3; http://appstech-sam.blogspot.com/2006/09/oracle-diagnostics/html, Oracle Corp., Rdwd Shrs, CA, US.

* cited by examiner

DIAGNOSTIC TEST SETS

BACKGROUND

Computers and the applications that run on them continue to get more sophisticated. Similarly, databases and the applications that interact with them continue to get more sophisticated. Thus, diagnosing actual and/or potential problems continues to grow in difficulty. Conventionally users have had limited tools to help them probe and diagnose their systems. Thus, users may have had to manually select tests to run, manually configure inputs for the tests, manually initiate the tests, and perform other manual tasks. Users may then have had to repeat the selection, configuration, and initiation all over again when they wanted to repeat the testing. These processes may have involved searching manuals, searching on a local system for vendor provided test programs, searching the Internet for available diagnostics, making phone calls, manually configuring tests, manually running tests, and so on.

While some manufacturers may provide a test program or even a suite of test programs, these tend to be static programs that may get out of date and/or become obsolete. Furthermore, these test programs still tend to require unacceptable levels of user configuration and/or control. Some manufacturers may provide diagnostic tests that can be downloaded and run by a user. Some tests may even execute automatically after being downloaded into, for example, a browser. However, repeatability may be difficult, if possible at all, to achieve.

Manufacturers or other third parties may also provide online assistance where a support person will "take over" a remote computer to try to diagnose a problem. This remote control usually relies on analyzing information available on the implicated computer. This remote control may sometimes involve running a diagnostic program on the implicated computer. As a result of the remote control, the support person and/or the user of the implicated computer may decide to download a patch (e.g., executable) to fix the problem(s). Even in this paradigm, finding and providing inputs to diagnostics may be a timely, difficult, and non-repeatable process that unnecessarily burdens the user for whom the diagnostics are being performed.

While these approaches have provided some relief to users, they have not provided a comprehensive, integrated, pluggable diagnostic solution. Diagnostics provided from different sources tend not to work together and thus individual items may be tested in isolation. Furthermore, these approaches tend to be "one shot" after the fact attempts at diagnosing and/or repairing problems. Additionally, these approaches tend to require sophisticated actions from a user who may have neither the experience to understand such actions nor the time to acquire such experience.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) represent one example of the boundaries and that in some examples one element may be designed as multiple elements, that multiple elements may be designed as one element, that an element shown as an internal component of another element may be implemented as an external component and vice versa, that elements may not be drawn to scale, and so on.

DETAILED DESCRIPTION

Figure 1:
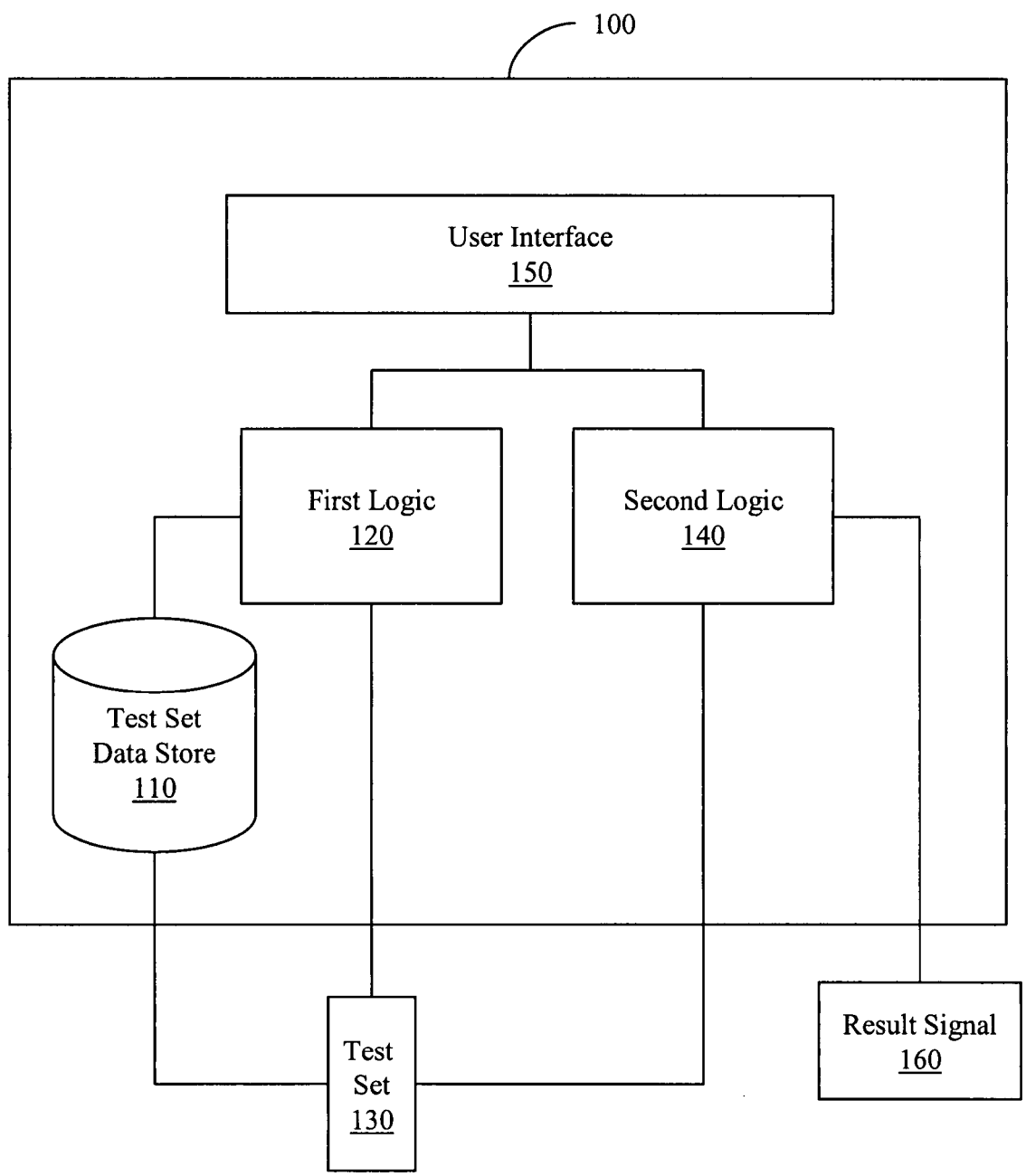
FIG. 1 illustrates an example system for metadata driven diagnostic testing.

This application describes systems and methods associated with metadata driven diagnostic tests. The tests may be selected, downloaded, configured, and/or executed using a web interface that interacts with an XML (extensible markup language) file. A set of diagnostic tests to be applied against a set of features in a set of applications that interact with a set of databases may be described in the XML file. The XML file may also describe inputs to be used with the diagnostic tests. The XML file may be provided by a product manufacturer, by a support organization, by a third party, by the user of the computer to be tested, and so on. The XML file can be examined by a diagnostics framework (e.g., application, set of applications) on the computer to be tested and/or on a computer to test the computer to be tested. The XML file can operate like a "play list" that identifies diagnostic tests to be run, the order in which they are to be run, pipelining that occurs between tests, inputs to be provided for the tests, and so on. The diagnostic framework that will run the tests will understand how to handle completely missing and/or partially missing inputs. The user of the computer to be tested can assemble the play list, customize the play list (e.g., bundle tests, order tests, describe how to handle missing inputs, describe pipelining, describe where/how to save results), save the play list, provide the play list to others, cause tests to be run from the play list, schedule tests to be run from the play list, and so on. In one example, play list creation, manipulation, saving, and distribution may be handled using a web based interface.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical disk, magnetic disks, and so on.

Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software in execution fixed in a tangible medium, and/or combinations of each to perform a function (s) or an action(s), and/or to cause a function or action from another logic, method, and/or system. For example, based on a desired application or needs, logic may include a software controlled microprocessor, discrete logic (e.g., an application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities including a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, refers to software in execution. Thus, software includes but is not limited to, one or more computer or processor instructions that can be read, interpreted, compiled, and/or executed and that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software may also be implemented in a variety of executable and/or loadable forms including, but not limited to, a stand-alone program, a function (local and/or remote), a servelet, an applet, instructions stored in a memory, part of an operating system, other types of executable instructions, and so on. It will be appreciated that computer-readable and/or executable instructions can be located in one logic and/or distributed between two or more communicating, co-operating, and/or parallel processing logics and thus can be loaded and/or executed in serial, parallel, massively parallel and other manners.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and so on.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and displaying, refer to actions and processes of a computer system, logic, processor, or similar electronic device that manipulates and transforms data represented as physical (electronic) quantities.

Turning now to FIG. 1, a system 100 involved with preparing and using a diagnostic test set 130 for metadata driven diagnostic testing is illustrated. System 100 includes a data store 110 to store a diagnostic test set 130. While a single test set 130 is illustrated, it is to be appreciated that a greater number of test sets may be stored. In one example, a diagnostic test set 130 is an XML (extensile markup language) file that provides a description of one or more diagnostic tests. The diagnostic test can be configured to analyze a database application, a database, a database application interaction with a database, and so on. The description in the XML file may include, for example, a diagnostic test name, a diagnostic test location, and a set of inputs for the diagnostic test. While three items are described, it is to be appreciated that a greater and/or lesser number of items may be described by the metadata located in the XML file.

System 100 may include a first logic 120 to prepare the diagnostic test set 130 to control a diagnostic session. In one example, preparing the diagnostic test set 130 may include selecting features to be tested, selecting applications to be tested, selecting databases to be tested, and selecting target machines to be tested. These selections may be made in response to user inputs provided, for example, through a user interface 150. Unlike conventional systems, these selections may be memorialized in test set 130. Thus, test set 130 may be created once and used multiple times.

System 100 may also include a second logic 140 to cause the diagnostic session to execute. The diagnostic session may be controlled, at least in part, by data stored in the diagnostic test set 130 prepared by the first logic 120. For example, the diagnostic test set 130 may be parsed to determine specific tests to be run against specific applications. The diagnostic test set 130 may describe the inputs to be used for the test. In some examples, when partial or complete inputs are not available, the first logic 120 may acquire and/or establish values for inputs. The first logic 120 may, for example, prompt a user to provide an input. The first logic 120 may, alternatively and/or additionally, provide an input value from a default source. The first logic 120 may, alternatively and/or additionally, establish a default value for an input value. These values, whether initially included in test set 130, acquired from a user through the user interface 150, or established as default values, can then be used by second logic 140 to control the diagnostic session. Second logic 140 may produce a result signal 160. This result signal 160 may be, for example, a success/failure indicator, a score value, an HTML (hypertext markup language) file, an XML file, a spreadsheet, a table, and so on.

System 100 may also include a web-based user interface 150. Interface 150 may be, for example, a Java Server Pages (JSP) application. The interface 150 may be used, for example, to find test sets, to configure test sets, to select test sets for sessions, and so on. In one example, the interface 150 may be used to facilitate creating a user-defined diagnostic test set. This user-defined diagnostic test set may function like a "play list" for a user. The user can select which diagnostics to run, describe them in the XML file, have them described in the XML as the result of automatic generation, store the XML file, and then cause the tests to be run by providing the XML file to a diagnostics framework. Thus, unlike conventional systems where repeating tests requires repeating configuration, a test set 130 may act like a "my favorites" of diagnostics, where the "favorites" can be configured once then run on demand. The following XML code illustrates portions of a sample XML file. The sample XML code includes three types of test descriptions: one with the inputs completely specified, one with the inputs partially specified, and one with no inputs specified. In one example, when inputs are partially specified, a user will be prompted for the missing inputs. In another example, when inputs are missing completely, default values will be used.

Sample XML File

```
<TestSet setName="abc" file-version="1.1">
   <TestApp appShortName="SYSTEM_TESTS">
      <TestSuite groupName="DBConnections">
<!-- test with no inputs specified, will pick up defaults as necessary - - >
         <Test type="DIAGNOSTIC" information about test />
      </TestSuite>
   </TestApp>
   <TestApp appShortName="testx">
      <TestSuite groupName="UserTest1">
<!-- test with inputs specified and present, will run with these inputs - - >
         <Test type="DIAGNOSTIC" information about test>
            <InputParams>
               <InputParam>
                  <InputName>Uname</InputName>
                  <InputValue>value</Inputvalue>
               </InputParam>
               <InputParam>
                  <InputName>pword</InputName>
                  <InputValue>fluffy</Inputvalue>
               </InputParam>
            </InputParams>
         </Test>
      </TestSuite>
   </TestApp>
   <TestApp appShortName="testy">
      <TestSuite groupName="UserTest2">
<!-- test with inputs specified and partially missing, will prompt user-->
         <Test type="DIAGNOSTIC" information about test>
            <InputParams>
               <InputParam>
                  <InputName>Uname</InputName>
                  <InputValue>value</Inputvalue>
               </InputParam>
               <InputParam>
```

-continued

Sample XML File

```
                  <InputName>pword</InputName>
                  <!-- input param specified- - >
                  <! - - value missing, prompt user- - >
                  <InputValue></Inputvalue>
               </InputParam>
            </InputParams>
         </Test>
      </TestSuite>
   </TestApp>
</TestSet>
```

Figure 2:
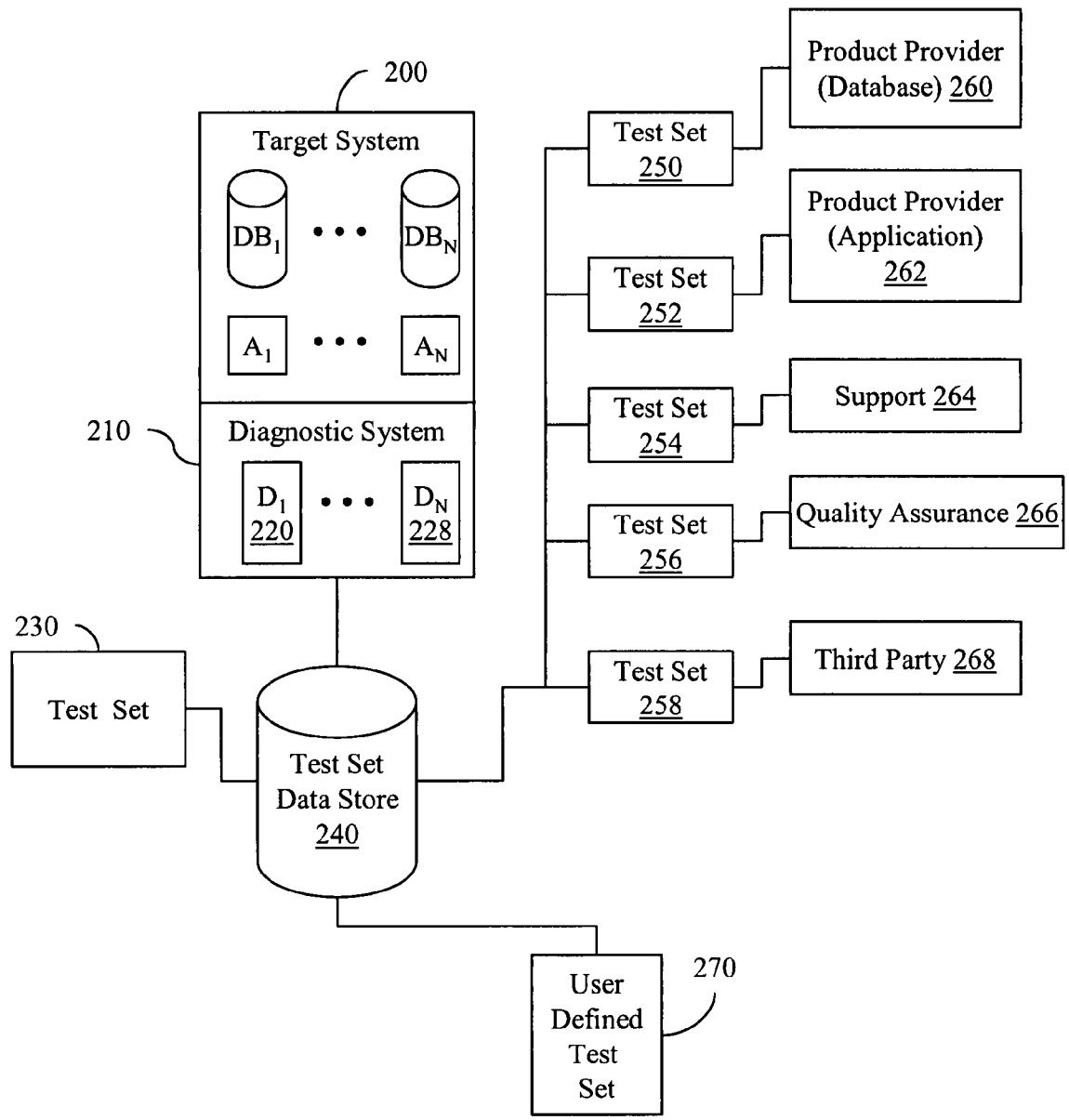
FIG. 2 illustrates an example environment from which content for a diagnostic test set can be gathered.

FIG. 2 illustrates an example environment from which diagnostic test sets can be gathered. A target system 200 is to be tested. Target system 200 may include a set of applications ($A_1 \ldots A_N$) that interact with a set of databases ($DB_1 \ldots DB_N$). Target system 200 may include a diagnostic system 210 that is configured to run one or more diagnostics 220 through 228 (e.g., diagnostic tests). Diagnostics 220-228 may include, for example, a PL/SQL (procedural language/structured query language) application, a JSP application, a Java application, a shell script application, a Perl application, and so on.

While diagnostic system 210 and diagnostics 220-228 are illustrated as being on target system 200, it is to be appreciated that a diagnostic system may be remote to a system to be tested. See, for example, FIG. 3. Thus, referring back to FIG. 1, it is to be appreciated that in some embodiments second logic 140 may be located on a target system and in other embodiments second logic 140 may be located on a system apart from but operably connected to and/or in data communication with a target system.

Diagnostic system 210 may be configured to run a diagnostic session that is controlled by a test set 230. Test set 230 may be one of a set of diagnostic test sets stored in a test set data store 240. While test set data store 240 is illustrated as a single data store located external to system 210, it is to be appreciated that data store 240 could be one or more data stores located in different locations and/or distributed between different locations and/or systems, including within system 200. Thus, within the same environment, two or more separate data stores may be employed, in one example, employed simultaneously.

So how did the set of diagnostic test sets get into test set data store 240? FIG. 2 illustrates that test sets and/or elements thereof can be received from a variety of locations. For example, a test set 250 may be received from a database product provider 260. Similarly, a test set 252 may be received from an application provider 262 and a test set 254 may be received from a support entity 264. Likewise, a test set 256 may be received from a quality assurance entity 266 and a test set 258 may be received from a third party 268. Test sets 250 and 252 may be pre-defined test sets provided or made available by vendors to accompany their products. Tests sets 254 and 256 may be later designed test sets. Later designed test sets may be designed to test a bug that the vendors did not anticipate, to exercise some interaction between applications and databases (and/or database tables), to exercise interactions between applications and various hardware, and so on. Test set 258 may be provided by a third party for various reasons. For example, diagnostics of whether auditing like that associated with Sarbanes-Oxley can be performed may be exercised using a test set 258.

FIG. 2 also illustrates a user defined test set 270. Thus, not only can pre-defined and third-party defined diagnostic test sets be used by diagnostic system 210 to test target system 200, but so too can user-defined test sets. In different examples, user defined test set 270 may be crafted from pieces of test sets 250 through 258, may be crafted completely from scratch by a user, and/or may be crafted from combinations thereof. User-defined test set 270 may therefore function as the "favorites" play list for a user.

The diagnostics 220-228 may be configurable. Thus, it is to be appreciated that test set 230 may also be configurable to control the configurable execution of diagnostics 220-228. For example, diagnostics 220-228 may be configurable with respect to a user selectable set of features to be tested for a user selectable set of applications resident on a user-selectable set of computers. Furthermore, diagnostics 220-228 may be configurable with respect to a user selectable set of databases resident on a second user selectable set of computers with which the user selectable set of applications are to interact.

Figure 3:
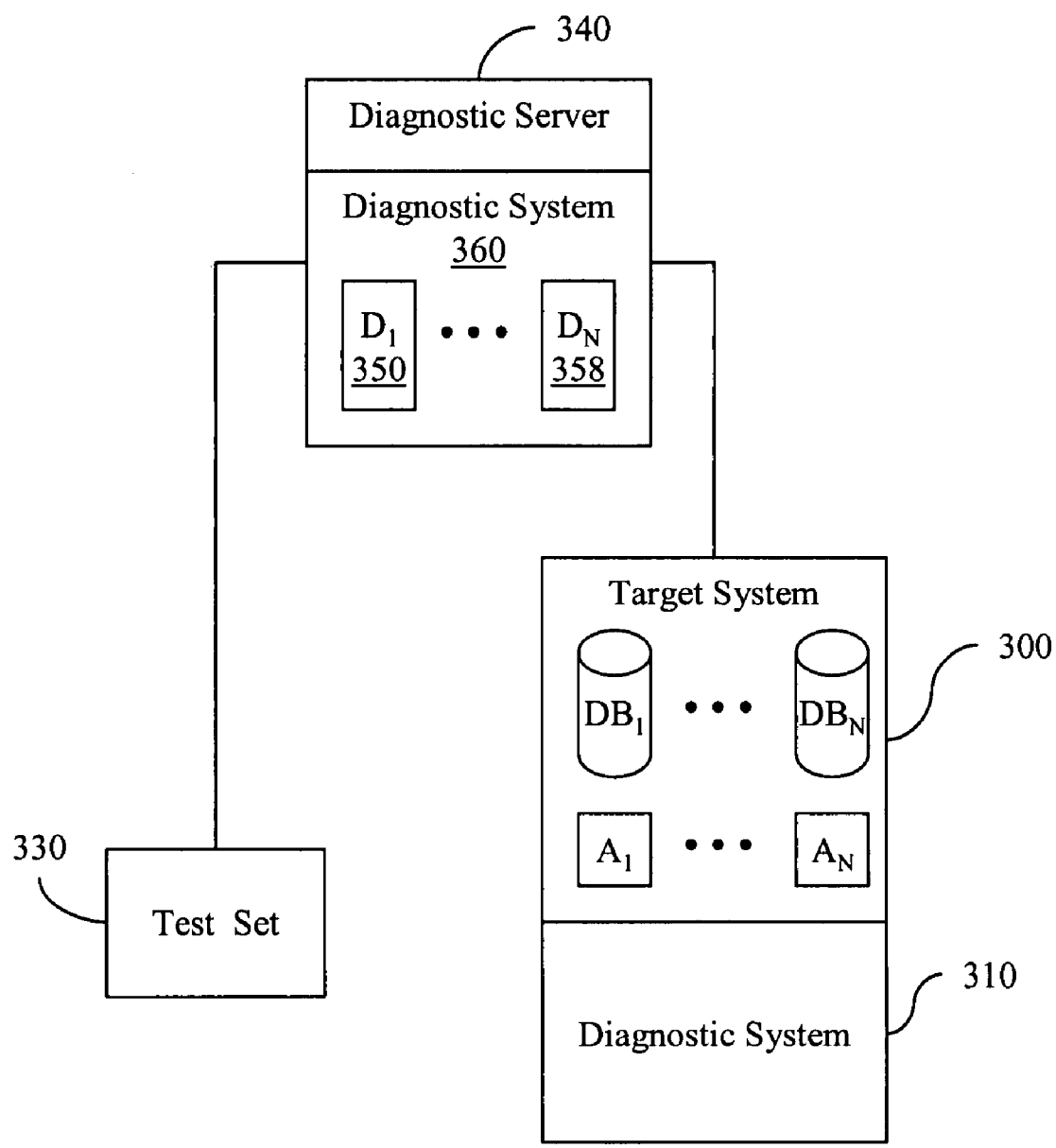
FIG. 3 illustrates an example system for metadata driven diagnostic testing.

FIG. 3 illustrates a target system 300 to be tested using metadata driven diagnostic testing. Target system 300 includes a diagnostic system 310. However, unlike system 200 (FIG. 2), system 300 is operably connected to and/or in data communication with a diagnostic server 340 on which diagnostics 350-358 and a second diagnostic system 360 resides. Diagnostic server 340 and/or diagnostic 350-358 may execute tests that exercise applications (e.g., $A_1 \ldots A_N$) that interact with databases (e.g., $DB_1 \ldots DB_N$) on target system 300. Diagnostic server 340, diagnostics 350-358, and/or diagnostic system 360 may interact with and may be controlled, at least in part, by the metadata found in test set 330. While FIG. 2 illustrates diagnostics 220-228 residing on a target system 200 and while FIG. 3 illustrates diagnostics 350-358 residing on a diagnostic server 340, it is to be appreciated that in some embodiments a combination of diagnostics located both locally and remotely to the target machine may be employed.

The diagnostic tests may identify actual, potential, and/or imminent performance bottlenecks, configuration issues, interaction issues, security issues, and so on. The diagnostic tests may be specific to application areas (e.g., technical areas, functional areas), to applications (e.g., general ledger, administration, customer relation management, scheduling), to problem areas (e.g., installation issues, data issues, bandwidth issues, storage issues, index maintenance issues, normalization issues, tier issues), and so on.

In one embodiment, diagnostic test sets are XML files containing the definition of diagnostic tests including available inputs. Diagnostic test sets can be provided with a product, provided by a support organization, provided by a third party, user-defined, and so on. Diagnostic test sets can be stored at searchable locations on the Internet, on an Intranet, in a file system, in a system tasked with running diagnostics, on a system for which diagnostics are to be performed, and so on. A diagnostic test set can describe a set of diagnostics that can be run against a set of applications. The test set can control a computer to perform the set of diagnostics in a desired order using desired inputs at a desired point in time.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that in some examples various actions could occur concurrently, substantially in parallel, and/or at substantially different points in time.

Figure 4:
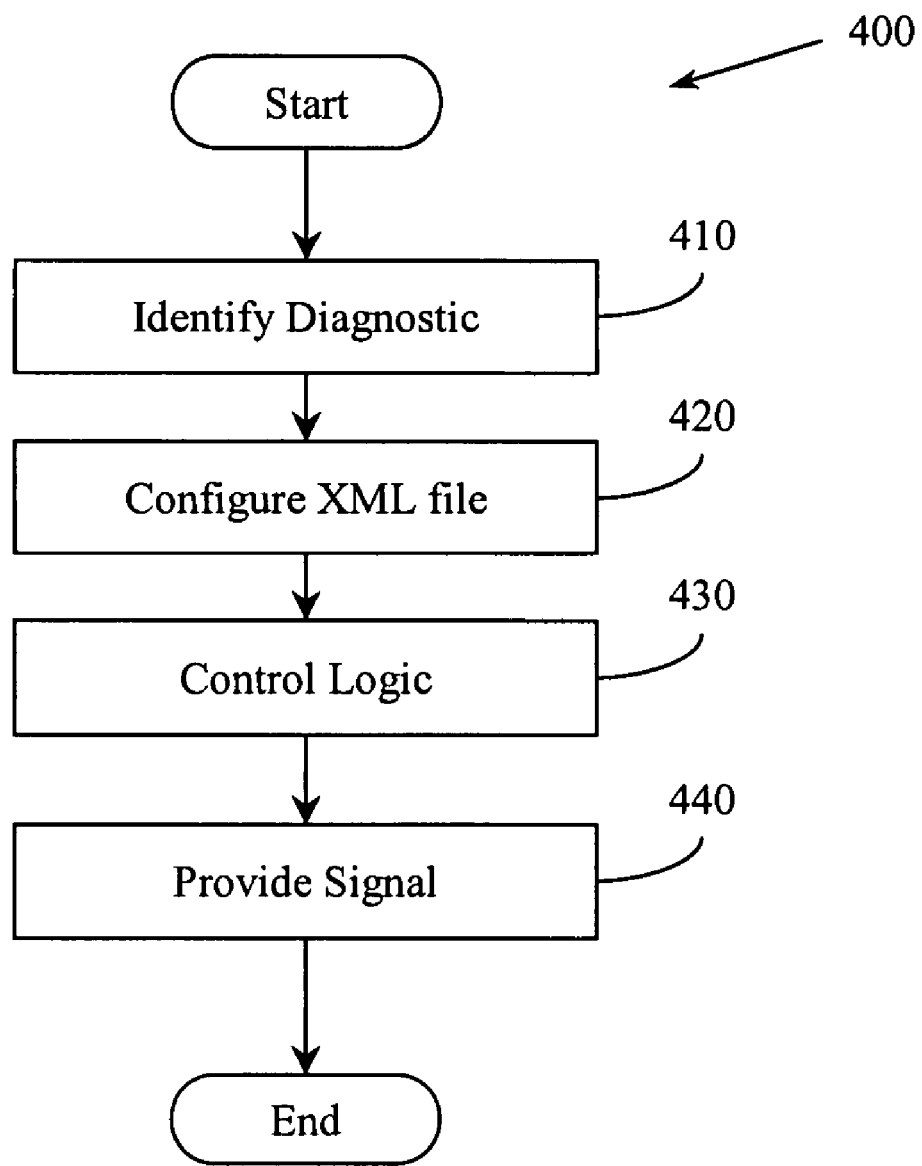
FIG. 4 illustrates an example method associated with metadata driven diagnostic testing.

FIG. 4 illustrates a method 400 associated with metadata driven diagnostic testing. Method 400 may include, at 410, identifying a plurality of diagnostics to be performed as part of a session to analyze an interaction between an application and a database. Identifying the set of diagnostics may include searching the Internet, searching an intranet, searching a file system, and so on. The searching may be performed using, for example, a JSP web-based interface.

Method 400 may also include, at 420, configuring an XML file to control the session. The XML file may store metadata to control metadata driven diagnostic test execution. As described above, diagnostic tests may be configurable on parameters including features to be tested, applications to be tested, databases with which interactions are to occur, and so on. Thus, the metadata may describe information for these configurations. Additionally and/or alternatively the metadata may include a diagnostic name, a diagnostic location, a diagnostic input, and a diagnostic output. In one example, configuring the XML file includes specifying a feature to be diagnosed and a set of applications for which the feature is to be diagnosed.

Method 400 may also include, at 430, controlling a logic to perform the diagnostic session. The logic may be controlled to perform the diagnostic session in accordance with metadata stored in the XML file configured at 420. Method 400 may then conclude, at 440, by providing a signal concerning the result of the diagnostic session.

While FIG. 4 illustrates various actions occurring in serial, it is to be appreciated that in some embodiments various actions illustrated in FIG. 4 could occur substantially in parallel. By way of illustration, a first process could identify diagnostics. Additionally, a second process could configure an XML file, while a third process could control a logic to perform the diagnostic and then provide a signal concerning the diagnostic. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform method 400. While method 400 is described being stored on a computer-readable medium, it is to be appreciated that other methods described herein can also be stored on a computer-readable medium.

Figure 5:
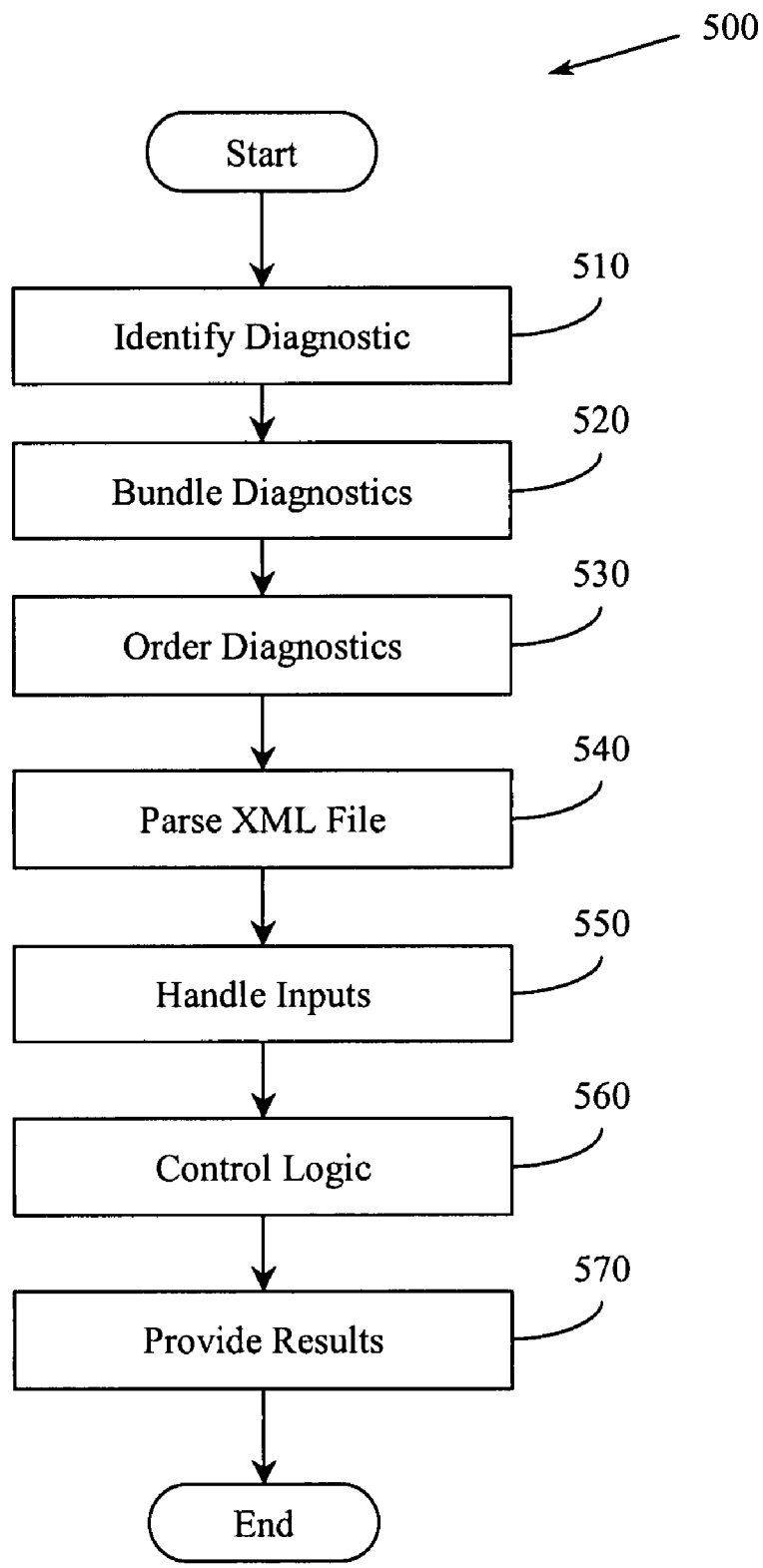
FIG. 5 illustrates an example method associated with metadata driven diagnostic testing.

FIG. 5 illustrates an example method 500 associated with metadata driven diagnostic testing. Method 500 may include, at 510, identifying one or more diagnostics to be performed as part of a session to analyze an application, a database, and/or an interaction between an application and a database. Identifying the set of diagnostics may include searching the Internet, searching an intranet, searching a file system, and so on. The searching may be performed using, for example, a JSP web-based interface.

Method 500 may also include, at 520, bundling a set of diagnostics together. Unlike conventional systems where a single test may be configured and run against a target system, here metadata describing a batch of diagnostics may be bundled together and saved in an XML file for current and/or future use. The bundling may be performed using, for example, the JSP web-based user interface.

Method 500 may also include, at 530, ordering the bundle of diagnostics. For example, a first test may be able to force a system into a first state that a second test may then exercise. Therefore, having the tests run in order may achieve a result that individual testing may not be able to achieve. Conventionally, diagnostics were run singly and manually, which may have made difficult, if possible at all, this type of ordered, bundled execution. The ordering may be performed using, for example, the JSP web-based user interface.

Method 500 may also include, at 540, parsing the XML file in which the metadata describes the diagnostic tests has been logically bundled at 520 and has been logically ordered at 530. Parsing the XML file may include examining the metadata to facilitate establishing connections, arranging for executables to be placed in a desired location, arranging for inputs to be acquired and placed at desired locations, and so on. While parsing the XML file is described, the XML file may, more generally, be processed.

Method 500 may also include, at 550, handling inputs. The diagnostic test set may, for different diagnostics, specify inputs completely, specify inputs partially, and/or not specify inputs at all. When the inputs are partially specified, in one example additional information may be gathered from a user through a web-based user interface. When the inputs are not specified at all, then in one example input values may be established using default values.

Method 500 may also include, at 560, controlling a logic to perform the session in accordance with the XML file. In one embodiment controlling the diagnostic logic includes providing a signal generated in response to processing the XML file. The signal may control initiating a test, connecting the output of a first test to the input of a second test, redirecting the output to a known location, and so on.

Method 500 may conclude, at 570, by providing a signal concerning the outcome of the session. In one embodiment, providing the signal includes providing an HTML (hypertext markup language) file, an XML file, a zipped up file that includes a plurality of other files, and so on.

Figure 6:
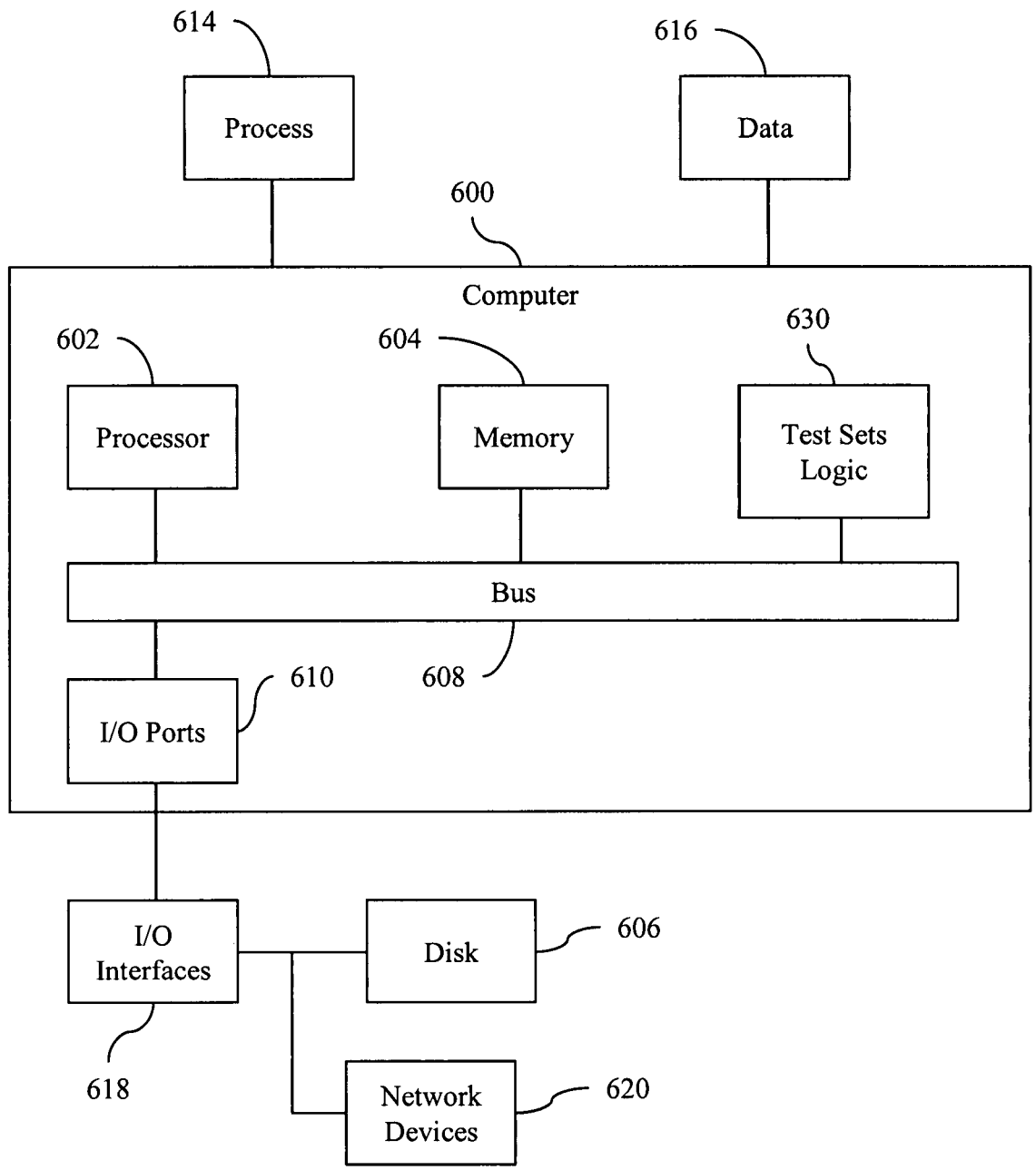
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include a test sets logic 630 configured to facilitate performing metadata driven diagnostic test execution.

Test sets logic 630 may provide means (e.g., hardware, software in execution, firmware) for acquiring an XML file that includes metadata for controlling metadata driven diagnostic test execution. The XML file may be searchable, shareable, viewable, and pluggable. Test sets logic 630 may also provide means (e.g., hardware, software in execution, firmware) for reconfiguring the XML file. Reconfiguring the XML file may facilitate identifying a feature to be tested, identifying an application to be tested, identifying a database to be tested, and so on. Tests sets logic 630 may also include means (e.g., hardware, software in execution, firmware) for controlling diagnostic test execution based on the metadata.

Generally describing an example configuration of the computer 600, the processor 602 can be a variety of various processors including dual microprocessor and other multiprocessor architectures. The memory 604 can include volatile memory and/or non-volatile memory. The non-volatile memory can include, but is not limited to, ROM, PROM, EPROM, and EEPROM. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can be, for example, a magnetic disk drive, a solid state disk drive, a floppy disk drive, a tape drive, a Zip drive, a flash memory card, a memory stick, and so on. Furthermore, the disk 606 can include optical drives (e.g., CD-ROM, CD recordable drive (CD-R drive), CD rewriteable drive (CD-RW drive), digital video ROM drive (DVD ROM)). The memory 604 can store processes 614 and/or data 616, for example. The disk 606 and/or memory 604 can store an operating system that controls and allocates resources of the computer 600. Additionally, the software described herein may be fixed in the tangible medium of memory 604.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, and network devices 620. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, the network devices 620 can connect to WAN technologies including, but not limited to, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a data store to store a diagnostic test set, where the diagnostic test set comprises metadata that describes a diagnostic test to be performed, where the diagnostic test is configurable to control analysis of a user selectable set of features for a user selectable set of applications resident on a user-selectable set of computers, and where the set of applications interact with a user selectable set of databases resident on a second user selectable set of computers;
   a first logic to prepare the diagnostic test set to control a diagnostic session; and
   a second logic to cause the diagnostic session to execute, the diagnostic session to be controlled, at least in part, by the diagnostic test set prepared by the first logic.

2. The system of claim 1 including a web-based user interface to locate a diagnostic test set, to configure a diagnostic test set, to select a diagnostic test set to control a diagnostic session, and to create a user-defined diagnostic test set.

3. The system of claim 2, the web-based user interface being a Java Server Pages (JSP) application.

4. The system of claim 2, where the web-based user interface is to locate a diagnostic test set on the Internet.

5. The system of claim 1, where to prepare a diagnostic test set to control a diagnostic session includes to select a feature to be tested, to select an application to be tested, to select a database to be tested, to select an interaction between an application and a database to be tested, and to select a target machine to be tested.

6. The system of claim 1 a diagnostic test set being an XML (extensible markup language) file that provides a description of one or more diagnostic tests configured to analyze one or more of, a database application, a database, and a database application interaction with a database.

7. The system of claim 6, the description to include one or more of, a diagnostic test name, a diagnostic test location, and a set of inputs for the diagnostic test.

8. The system of claim 1 where a diagnostic test is receivable from one or more of, a database provider, a database application provider, a quality assurance entity, a support entity, and a user.

9. The system of claim 1 a diagnostic test being one or more of, a PL/SQL (procedural language/structured query language) executable, a JSP executable, a Perl executable, a shell script executable, and a Java executable.

10. The system of claim 1, the second logic residing on the system to be tested.

11. The system of claim 1, the second logic not residing on the system to be tested.

12. The system of claim 1, where to prepare the diagnostic test set to control a diagnostic session includes selectively acquiring an input available in the test set and selectively acquiring a missing input value.

13. The system of claim 12, the missing input value to be acquired from one or more of, a user, and a default source.

14. A system, comprising:
    a data store to store a diagnostic test set, the diagnostic test set comprising metadata that describes a diagnostic test to be performed;
    a first logic to prepare the diagnostic test set to control a diagnostic session; and
    a second logic to cause the diagnostic session to execute, the diagnostic session to be controlled, at least in part, by the diagnostic test set prepared by the first logic;
    a JSP web-based user interface to locate the diagnostic test set on one of, the Internet, an intranet, and a file system, to configure the diagnostic test set, to select a diagnostic test set to control the diagnostic session, and to create a user-defined diagnostic test set, the diagnostic test set being an XML file that provides a description of one or more diagnostic tests configured to analyze one or more of, a database application, a database, and a database application interaction with a database, the description to include one or more of, a diagnostic test name, a diagnostic test location, and a set of inputs for the diagnostic test;
    where to configure the diagnostic test set includes selecting a feature to be tested, selecting an application to be tested, selecting a database to be tested, selecting an interaction between an application and a database to be tested, and selecting a target machine to be tested,
    the diagnostic test being one or more of, a PL/SQL executable, a JSP executable, a Perl executable, a shell script executable, and a Java executable,
    the diagnostic test set being configurable to control analysis of a user selectable set of features for a user selectable set of applications resident on a user-selectable set of computers, where the set of applications interact with a user selectable set of databases resident on a second user selectable set of computers; and
    where to prepare the diagnostic test set to control a diagnostic session comprises selectively acquiring an input available in the test set and selectively acquiring a missing input value from one or more of, a user, and a default source.

15. A computer-readable medium storing processor executable instructions operable to perform a method, the method comprising:
    identifying a diagnostic to be performed as part of a session to analyze one or more of an application, a database, and an interaction between the application and the database, where identifying the diagnostic includes receiving an input from a web-based user interface;
    configuring an XML file to control the session, where the XML file is to store metadata to control metadata driven diagnostic test execution, where configuring the XML file includes bundling a set of diagnostics to be performed as part of the session, ordering the set of diagnostics, and resolving inputs for the set of diagnostics, and where the metadata is to describe one or more of, a diagnostic name, a diagnostic location, a diagnostic input, and a diagnostic output;

controlling a diagnostic logic to perform the session in accordance with the XML file; and providing a first signal concerning the outcome of the session.

16. The computer-readable medium of claim 15, where configuring the XML file includes determining a feature to be diagnosed and determining a set of applications for which the feature is to be diagnosed.

17. The computer-readable medium of claim 15, where controlling the diagnostic logic includes providing a second signal that is generated in response to processing the XML file.

18. The computer-readable medium of claim 15, where providing the first signal concerning the outcome of the session includes providing one or more of, an HTML (hypertext markup language) file, an XML file, and a compressed collection of files.

19. A system, comprising:
a data store to store a diagnostic test set, where the diagnostic test set comprises metadata that describes a diagnostic test to be performed, where the diagnostic test is configurable to control analysis of a user selectable set of features for a user selectable set of applications resident on a user-selectable set of computers, and where the set of applications interact with a user selectable set of databases resident on a second user selectable set of computers;

means for preparing the diagnostic test set to control a diagnostic session; and means for causing the diagnostic session to execute, the diagnostic session to be controlled, at least in part, by the diagnostic test set prepared by the means for preparing.

20. The system of claim 19, comprising:
means for interfacing to locate the diagnostic test set;
means for configuring the diagnostic test set;
means for selecting the diagnostic test set to control a diagnostic session; and
means for creating a user-defined diagnostic test set.

21. A method, comprising:
identifying a diagnostic to be performed as part of a session to analyze one or more of an application, a database, and an interaction between the application and the database, where identifying the diagnostic includes receiving an input from a web-based user interface;

configuring an XML file to control the session, where the XML file is to store metadata to control metadata driven diagnostic test execution, where configuring the XML file includes bundling a set of diagnostics to be performed as part of the session, ordering the set of diagnostics, and resolving inputs for the set of diagnostics, and where the metadata is to describe one or more of, a diagnostic name, a diagnostic location, a diagnostic input, and a diagnostic output;

performing the session in accordance with the XML file; and providing a first signal concerning the outcome of the session.

22. The method of claim 21, where configuring the XML file comprises determining a feature to be diagnosed and determining a set of applications for which the feature is to be diagnosed.

23. The method of claim 21, where performing the session in accordance with the XML file comprises providing a second signal that is generated in response to processing the XML file.

24. The method of claim 21, where providing the first signal concerning the outcome of the session comprises providing one or more of, an HTML (hypertext markup language) file, an XML file, and a compressed collection of files.

* * * * *